US008718439B2

(12) United States Patent
Rosengart et al.

(10) Patent No.: US 8,718,439 B2
(45) Date of Patent: May 6, 2014

(54) METHOD FOR DISTRIBUTING SECOND MULTI-MEDIA CONTENT ITEMS IN A LIST OF FIRST MULTI-MEDIA CONTENT ITEMS

(75) Inventors: Frank Rosengart, Zürich (CH); Georg Müller-Loeffelholz, Berlin (DE); Thomas Zier, Berlin (DE)

(73) Assignee: Axel Springer Digital TV Guide GmbH, Berlin (DE)

( * ) Notice: Subject to any disclaimer, the term of this patent is extended or adjusted under 35 U.S.C. 154(b) by 0 days.

(21) Appl. No.: 12/998,039

(22) PCT Filed: Sep. 11, 2009

(86) PCT No.: PCT/EP2009/061811
§ 371 (c)(1),
(2), (4) Date: Mar. 11, 2011

(87) PCT Pub. No.: WO2010/029152
PCT Pub. Date: Mar. 18, 2010

(65) Prior Publication Data
US 2011/0170838 A1 Jul. 14, 2011

(30) Foreign Application Priority Data

Sep. 12, 2008 (EP) .................................... 08164299
Dec. 11, 2008 (EP) .................................... 08171335
Feb. 4, 2009 (EP) .................................... 09152030

(51) Int. Cl.
*H04N 5/932* (2006.01)
(52) U.S. Cl.
USPC ........................................ 386/219; 386/282

(58) Field of Classification Search
None
See application file for complete search history.

(56) References Cited

U.S. PATENT DOCUMENTS

| | | | |
|---|---|---|---|
| 2003/0093790 A1 | 5/2003 | Logan et al. | |
| 2006/0041536 A1* | 2/2006 | Scholl et al. | 707/3 |
| 2006/0184417 A1* | 8/2006 | Van der Linden et al. | 705/14 |
| 2009/0210899 A1* | 8/2009 | Lawrence-Apfelbaum et al. | 725/34 |
| 2009/0292376 A1* | 11/2009 | Kazem et al. | 700/94 |

FOREIGN PATENT DOCUMENTS

WO 2005086865 A2 9/2005

* cited by examiner

*Primary Examiner* — Williams C Vaughn, Jr.
*Assistant Examiner* — Eileen Adams
(74) *Attorney, Agent, or Firm* — Ware, Fresola, Maguire & Barber LLP

(57) ABSTRACT

A method of distributing second multi-media content items into a list having at least one first multi-media content item is provided. The list of the first multi-media content item is to be reproduced on a personal TV system. A playlist of first multi-media content items is selected from a plurality of first multi-media content items available on different TV channels. Potential second multi-media content items from a plurality of available second multi-media content items are determined by matching information from the first and second multi-media content items. At least one of the determined second multi-media content items are selected based on a user profile, metadata of the first and second multi-media content items and/or a distribution scheme for distributing the second multi-media content items into the playlist of the first multi-media content items.

6 Claims, 5 Drawing Sheets

METHOD FOR DISTRIBUTING SECOND MULTI-MEDIA CONTENT ITEMS IN A LIST OF FIRST MULTI-MEDIA CONTENT ITEMS

CROSS REFERENCE TO RELATED APPLICATIONS

This application is for entry into the U.S. national phase under §371 for International Application No. PCT/EP2009/061811 having an international filing date of Sep. 11, 2009, which claims priority to European Patent Application No. 08164299.3 filed on Sep. 12, 2008, European Patent Application No. 08171335.6 filed Dec. 11, 2008, and European Patent Application No. 09152030.4 filed Feb. 4, 2009.

BACKGROUND OF THE INVENTION

1. Technical Field

The present invention relates to a method for distributing second multi-media content items in a list of first multi-media content items.

2. Discussion of Related Art

Personal TV systems are becoming readily available where the user can select a playlist from a plurality of movies, TV shows, etc. from a plurality of TV channels. The contents of the playlist are transferred to the personal TV system and are reproduced. The content of the playlist can be downloaded to the personal TV system before being reproduced or the content can be reproduced as a stream. In order to earn money, TV broadcasters or content providers need to introduce advertising into the content which is viewed by the user. Traditionally, advertising has been introduced by the TV broadcasters at the beginning and end of a movie or a TV show as well as after certain time periods like 30 minutes.

However, the traditional introducing of advertising in the TV broadcast is not directed to an individual person and his preferences but it is directed to a plurality of viewers. In the traditional TV broadcast, there is no possibility to provide advertising for individuals based on their own personal profile.

It is an object of the invention to provide a method for distributing advertising items in a playlist for a personal TV system.

This object is solved by a method according to claim 1 and a set-top-box according to claim 5.

DISCLOSURE OF INVENTION

Therefore, a method of distributing second multi-media content items into a list having at least one first multi-media content item is provided. The list of the first multi-media content item is to be reproduced on a personal TV system. A playlist of first multi-media content items is selected from a plurality of first multi-media content items available on different TV channels. Potential second multi-media content items from a plurality of available second multi-media content items are determined by matching information from the first and second multi-media content items. At least one of the determined second multi-media content items are selected based on a user profile, metadata of the first and second multi-media content items and/or a distribution scheme for distributing the second multi-media content items into the playlist of the first multi-media content items.

According to an aspect of the invention, the first multi-media content items are multi-media content items available on a plurality of TV channels and the second multi-media content items are advertisement items.

According to an aspect of the invention, the determination of potential second multi-media content items and the selection of the at least one determined second multi-media content item is triggered by selecting a new first multi-media content item into the playlist or by deleting a first multi-media content item from the playlist.

According to a further aspect of the invention, the selection of one of the determined second multi-media content items is based on a previous placement of the second multi-media content items into the playlist and on a sorting of the determined second multi-media content items if more than one second multi-media content item has been determined. The sorting is based on at least one relevance coefficient.

The invention also relates to a set-top-box with a memory for storing or caching first and second multi-media items, a playlist unit for creating a playlist of a plurality of first multi-media content items from available first multi-media content items on the different TV channels. The set-top-box furthermore comprises a recommender unit for determining potential second multi-media content items from a plurality of available second multi-media content items by matching information on the first and second multi-media content items and by selecting at least one of the determined second multi-media content items. The set-top-box furthermore comprises a reproducing unit for reproducing the first and second multi-media content items stored in the memory according to the playlist.

The present invention relates to the idea to dynamically distribute or intersperse advertising content amongst existing content items in a playlist of a personal channel in a TV system. The distribution can be implemented by a fixed number scheme, by a count-per-count ratio (count based scheme), by a time per time ratio (duration based scheme) or by a count per time ratio scheme. The interspersing of advertising content can depend on the distribution scheme, parameters of the distribution scheme as well as a pool of advertising assets. Based on the selected distribution scheme and the parameters of the distribution scheme, an advertising asset is selected and can be inserted into the playlist.

Further aspects of the invention are described in the dependent claims.

BRIEF DESCRIPTION OF THE DRAWINGS

Advantages and embodiments of the invention will now be described in more detail with reference to the figures.

DETAILED DESCRIPTION

Figure 1:
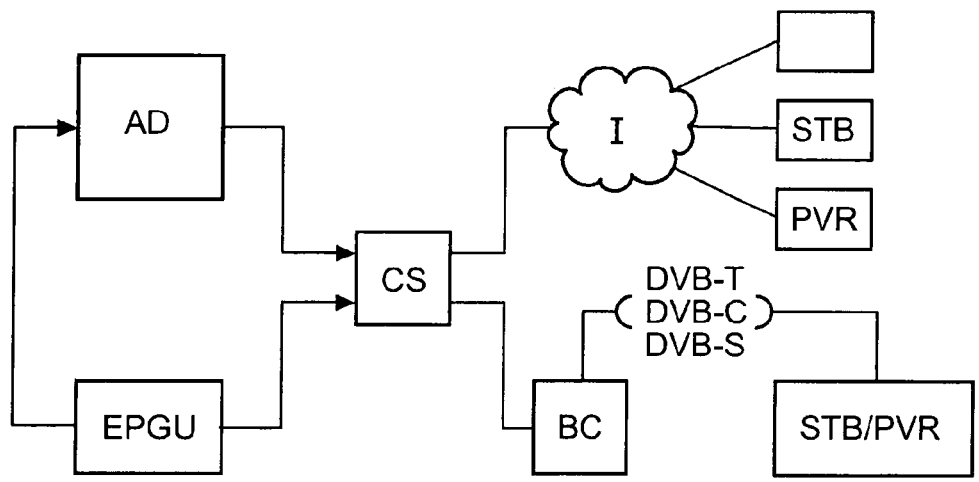
FIG. 1 shows a schematic representation of an entertainment system according to the invention.

FIG. 1 shows a schematic representation of an overall entertainment system according to the invention. Set-topboxes STB or personal video recorders PVR can be coupled to an internet I for receiving information. The set-top-box STB or the personal video recorder PVR together with a display can form a personal TV system. Furthermore, set-top-boxes STB and/or personal video recorders PVR may receive information via a DVB-S, DVB-C or DVB-T signal. The system furthermore comprises a content server CS on which multi-media content is stored which is to be forwarded via the internet or to be broadcasted via a broadcast system BC. The multi-media content stored on the content server CS may include movies, documentaries, videos, infomercial, advertising, etc. The content may alternatively or in addition be stored on a further server which can be external to the content server CS.

The system furthermore comprises an advertising unit AD for storing advertising content and metadata relating to the advertising content. The system furthermore comprises an electronic program guide unit EPGU where information regarding the content on the server CS is stored.

By means of the set-top-boxes STB or the personal video recorder PVR (i.e. by means of a client device), a user may select from the available multi-media content on the content server CS, movies, TV-shows, documentaries or the like which he intends to view on his personal channel. With the client device the user can decide for himself which movies, TV shows, documentaries, etc. he intends to watch. Moreover, the user can select content items based on the electronic program guide EPG from among a plurality of channels which multi-media content he intends to view and can create a playlist.

With the entertainment system according to the invention, advertising content which can be stored in the advertising unit AD is introduced and distributed into the playlist of the personal channel of the user. The playlist of the personal channel of the user will include those multi-media content which the user has selected based on the information from the electronic program guide EPG. In particular, the advertising content can be dynamically distributed or interspersed among existing items in the playlist of the user. The distribution can be performed based on various distribution schemes. One of such distribution schemes is the fixed number scheme. A specific number of advertising content like videos is inserted into the playlist independently of the number of items in the playlist. A further distribution scheme is the count-per-count ratio (count based) scheme. Here, a ratio of the number of the advertising content with respect to the number of existing items in the playlist is defined. For example, a 1:4 count based placement corresponds to an insertion of one advertising item for every four items in the playlist.

A further distribution scheme is the time-per-time ration (duration based) scheme. Here, the ratio of the playback duration of the advertising items with respect to the playback distribution of the existing playlist items is defined. As an example, a 10:60 duration based placement corresponds to ten minutes of advertising content for every sixty minutes of existing playlist content. The content may be a single ten minute long advertising content or a number of shorter advertising items with a total of ten minutes.

A further distribution scheme is a count-per-time ratio scheme. Here, a ratio of the number of advertising content with respect to the playback duration of the existing items in the playlist is defined. For example, a 1:60 count per time placement relates to one advertising item for every sixty minutes of a content in the playlist regardless of the running time of the advertising content.

The selection and placement of the advertising content into the playlist of a user can depend on the distribution scheme as mentioned above, the parameters of the distribution scheme like the playlist item count and/or duration, the ratio of the distribution schemes. The advertising placement can also depend on the existing advertising items in the advertising pool.

The advertising items may include infomercials, advertising videos, banners, pre-, mid- and post-roll advertising items, i.e. short advertisements that are replayed before, during (at predefined cutting points) or after an event, overlays over video advertisement, etc.

Video advertisements may include infomercials, i.e. long-form video which is mapped to events and which is inserted into channels as visible programming (items of playlist) and pre-roll, post-roll advertisements which are very short video advertisement which are not visible in the person channel and which are replayed before or after an event.

It should be noted that the processes depicted in the FIGS. 2 to 8 are preferably processed in the set-top-box STB or the personal video recorder PVR, i.e. at the client's side.

Figure 2:
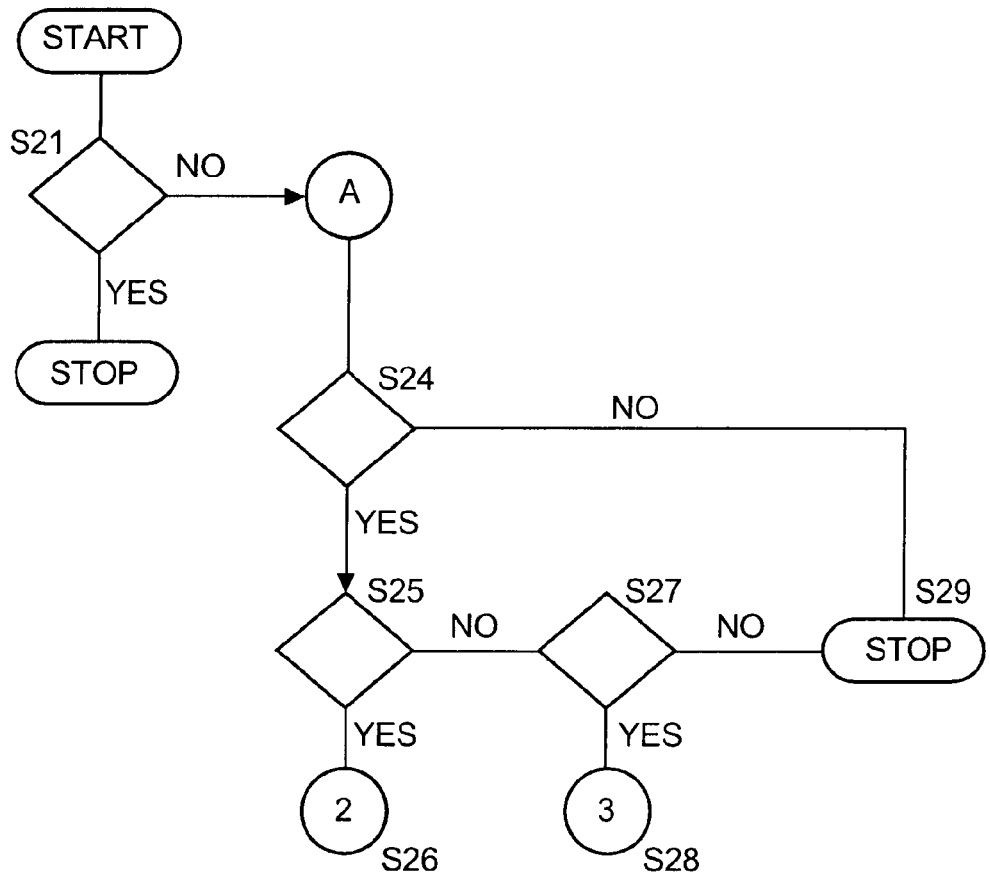
FIG. 2 shows a flow chart of a video advertisement placement method according to a first embodiment.

FIG. 2 shows a flow chart of a video advertisement placement method according to a first embodiment. Here, the flow for an insertion of video advertisements adjacent to an event in the playlist or in the personal channel is depicted. In step S20, the method is started. Here, the set-top-box STB or the personal video recorder PVR has identified an event or content in the playlist which requires the performance of an advertisement insertion on a target object. The target object can be a single show or an event in the channel or the playlist. The event can be triggered by recording the show (for example when the recording is beginning) or the deletion of a show. Such a triggering can be used to select new advertisements which can be introduced into the playlist. This can for example be performed by means of a scheduler for scheduling the advertisements similar to the scheduling of the multi-media content. The scheduler for advertisement may receive the channels including the shows or movies according to the playlist. The scheduler for advertising may receive this information from a scheduler for the multi-media content. The scheduler for advertisement can then decide whether or not an advertisement has to be fetched for example from the advertising unit AD. Based on the information of the distribution scheme, the parameters of the distribution scheme and/or the available advertising items, the scheduler can decide which advertisement content is to be introduced into the playlist. The scheduler may also decide on the place of the advertisement content in the playlist.

In step S21, the channels are monitored and the count per count, time per time, count per time ratio, etc. is determined. If the channel is already overrated, i.e. if the channel already comprises sufficient advertising content, then the process is stopped. However, if the channel does not contain sufficient advertising content, then in step S23, the placement of the advertising items is determined. Furthermore, if several advertising items are available to be placed into the playlist, the advertising item which has the highest value is introduced. The highest value can be determined by combining target information from the advertiser which prioritisation methods from the server, commercial factoring, popularity, etc. This process is described in more detail in FIG. 3.

In step S24, it is determined whether an advertising item is present which can be placed. If this is not the case, the process is stopped in step S29. Otherwise, it is determined in step S25 whether the advertising item is an infomercial. If this is the case, then in step S26, an infomercial is placed. The process of placing the infomercial is described in more detail with reference to FIG. 4.

If it is determined in step S25 that no infomercial is present, it is determined in step S27 whether the advertising item is a pre-roll or a post-roll advertising item. If this is not the case, then the flow continues to step S29 and the process is stopped. Otherwise, the flow continues to step S28 and a process of placing pre-rolls or post-rolls is started. The process of placing pre- or post-rolls is described in more detail with respect to FIG. 6.

In the step S23, an advertising item can also be placed implicitly by a recommender unit. However, the same rules will apply.

Figure 3:
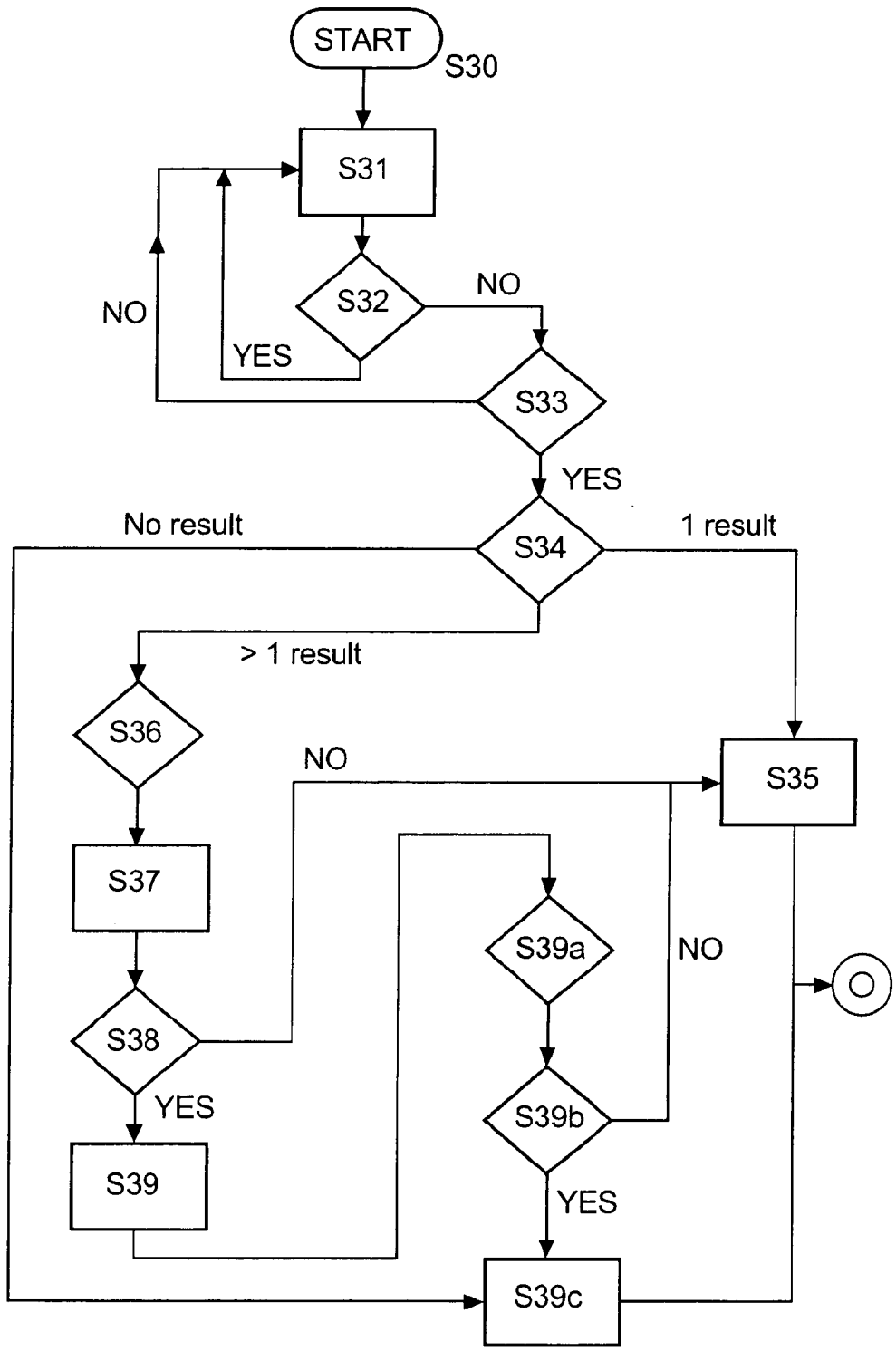
FIG. 3 shows a flow chart of a video advertisement placement according to a second embodiment.

FIG. 3 shows a flow chart of a video advertisement placement according to a second embodiment. In step S30, the process in step S23 is started. In step S31, the process is iterating through all advertising control files. Here, the content server CS is notified by the recommender or the scheduler of FIG. 2 arranged in the client that a new show has been recorded and/or added to a channel or playlist, i.e. the recommender notifies the content server CS that an event has taken place. In step S32, it is determined whether the advertising item has already been placed in the playlist or the personal channel before. If this is the case, the flow will go back to step S31. However, if the advertising item has not been placed into the playlist or the channel before, the flow will continue to step S33. It should be noted that in step S32, the information with respect to the number of placements of the advertising item can be kept until the advertising item is no longer in use or no longer valuable. Accordingly, this will mark an end of the life cycle of the advertising item.

In step S33, it is determined whether the targeting rules of the advertising item match the TV show or movie in the playlist that has been recorded or that has been added to the playlist. This can for example be performed by comparing the metadata of the advertising item with metadata of the selected show or the selected movie. However, if the advertising item does not match with the TV show or movie, the flow will go back to step S31. Otherwise, the flow will continue to step S34. In step S34, it is determined how many advertising items are present that can be introduced into the playlist and that match the selected TV show or movie.

If no results are present, the flow will continue to step S39c. Here, the recommender determines the best advertising item to be inserted. Accordingly, here an implicit advertising placement is performed.

If it is determined in step S34 that one result is present, then the flow will continue to step S35 where the advertising item is chosen to be placed into the playlist. However, if more than one result has been determined in step S34, the flow will continue to step S36. In step S36, the results of the advertising items can be sorted according to a first relevance coefficient A, wherein the highest relevance value is determined. The relevance coefficient A may be an integer between 0 and 100 which may be used to indicate the relevance of an advertising item. The higher the number, the greater the relevance of the advertising item. In step S37, only the control files with the highest relevance coefficient A are processed. If there is only one advertising item with the highest relevance coefficient A, the flow will continue to step S35 and this advertising item will be placed into the playlist.

However, if more than one advertising item is present with the highest relevant coefficient A, then the flow will continue to step S39. Here, the results will be sorted according to a second relevant coefficient B. As with the first relevance coefficient A, the second relevance coefficient may have an integer value 0 to 100 which indicates the relevance of the advertising item. In step S39a, the results of step S39 are sorted with respect to the highest second relevance coefficient B.

In step S39b, it is determined whether more than one advertising item is present with the highest second relevance coefficient B. If this is not the case, the flow will continue to step S35 and this advertising item is selected to be placed. If, however, more than one advertising item is present with the highest second relevance coefficient B, the flow will continue to step S39c. Here, the recommender will select the best available advertising item to be inserted.

It should be noted that the processes depicted in FIGS. 2 and 3 can be performed on the client's side, i.e. in the set-top-box STB or the personal video recorder PVR or alternatively in the content server CS or in a further server. The disadvantages of performing the processes of FIGS. 2 and 3 in a server are that such a server may have to deal with a very high load. Therefore, it is advantageous if the processes of FIGS. 2 and 3 are performed at the client's side.

It should also be noted that an implicit advertising item placement may occur on the fly, i.e. as events are recorded or as a personal channel is created. If a new event or a new personal channel is created or a new event is added, the recommender serves to determine whether the specified rules allow for the placement of an advertising item. If the placement of an advertising item is allowed, the recommender determines the location of the placement and will also try to find a place for the advertising item.

Figure 4:
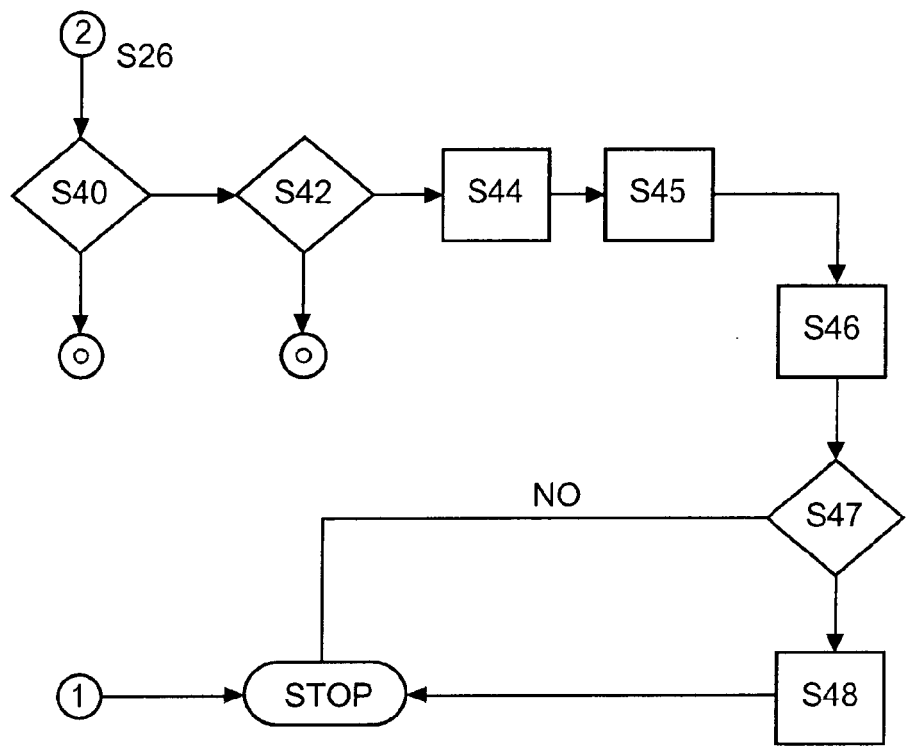
FIG. 4 shows a flow chart of an infomercial placement method according to a third embodiment.

FIG. 4 shows a flow chart of an infomercial placement method according to a third embodiment. The insertion of an infomercial can be based on metadata of the advertising items, contain information, etc. For an infomercial, the client can request that video advertisements are downloaded from the content server CS. An infomercial can only be matched to events but not to channel profiles. A video can be assigned to a matching event and can be positioned in front or after the channel listing. Alternatively, the infomercial can also be placed after an event in the new type of channels. An infomercial can be represented in the user interface by many different ways. If the infomercial is placed into the playlist, it can be treated as any other event in the channel. If an event is deleted, the matching advertising item is not deleted.

In FIG. 4, the detailed performance of the step S26 is depicted. In step S40, it is determined whether the advertising item (infomercial) has been placed with the event or whether the channel which contains the event. Here, it can be determined whether the advertising items have been there previously but it was not accepted by the user. If it is determined in step S40 that the advertising item has been previously placed, then the flow will continue to step S41 and is stopped. However, if the advertising item has not been placed with the event previously, the flow will continue to step S42, where it is determined whether the advertising item has been placed more than X times in the system and has been watched less than X times. If this is true, the flow will continue to step S43 and the flow will stop. Otherwise, the flow will continue to step S44 where the advertising item is associated with an object. In step S45, the advertising item is inserted into the channel before or after the event. In step S46, the advertising item (infomercial) is treated as any other event in the channel.

In step S47, it is determined whether more advertising items are present which can fit the available space in the playlist or the personal channel. If only one ad is present which can fit the available space, the flow will continue to step S49 and will stop, i.e. the advertising item will be placed in the playlist. Otherwise, the flow will continue to step S48 and here, the advertising items which do not fit anymore into the previously available space are placed in additional program selections.

For an explicit targeting of an advertising item, the placement rules and the data of the electronic program guide are forwarded. However, if an implicit targeting is to be performed, only the metadata is forwarded to the recommender and the recommender will place the ad.

The insertion of an advertising item can be performed through a rigid filter in a static manner, by the use of a self-learning recommender, i.e. a dynamic approach or by combining the relevance for the user as determined by the recommender with the criteria and priority from the server.

Metadata of the advertising item may include information for the user interface display like title, subtitle, description, thumbnails, duration, the type of the product, the related industry, the advertiser/company name, the brand, the agency, the director, the agency, the genre, the target demographic, i.e. the age, the target demographic, i.e. the region, the target demographic, i.e. income level, the target demographic, i.e. gender.

The description of an advertising item may include part of the metadata describing the advertising item for the electronic program guide, the title, sub-title, description, genre, keywords, etc.

Among the target scenario, the most likely are title targeting, actor/director targeting, genre targeting, keyword targeting, demographic target like gender, income, region, Nielsen region, age bracket, etc.

If more than one advertising item is available which can fit the available space in the playlist, it has to be determined which one of the advertising items is actually placed, wherein this determination is performed based on prioritisation and optimisation rules. Accordingly, the placement decision is based on priority and relevant values such as expected return, relevance of the advertising item, the advertising item matches more criteria, the use history (the advertising item of a branch/type that the user has been responsive to in the past, preferred/higher priority campaigns, campaign management (on the content server), advertiser budget (if the advertiser budget has already been reached, then no ad is placed). A recommender engine can remember which advertising item has been watched and which advertising item has been skipped in order to determine the probability whether this advertising item has actually been watched. Furthermore, the popularity of the advertising item can be measured by counting how often the advertising item has been displayed and watched, by counting how often the advertising item has been dropped out of the channel without being watched. If an advertising item has been reproduced once, the priority of the introducing of this advertising item into a playlist is reduced. Here, the recommender can memorize the type of advertising items which have been watched previously. The information of those advertising items which have been watched can be forwarded to a content server for further evaluations.

A maximum advertising item/content ratio can be determined. If the maximum ratio has not been reached, any matching advertising item can be (automatically) inserted into the playlist or the personal channel. However, if the maximum ratio has been reached, a recommender engine can prioritize additional programs as overflow for not placed items, i.e. the advertising items can be interleaved.

The prioritisation can be based on coefficients of popularity, expected click-through rates to expected return. The prioritisation can be determined by means of examining the behaviour of previous users and aggregate data from all users to perform the prioritisation. If the advertising item has been deleted, it can be replaced with any advertising item. The deletion of the advertising items can be based on the life cycle of a television show in the channel. For example, if a channel deletes a program after one week, the advertising items related to this program can also be deleted after one week. If only a maximum amount of events is allowed for each channel, the advertising items are deleted if the maximum number has been reached. However, an advertising item can also be marked as keep such that the system will not delete it.

On the client's side, i.e. in the set-top-box STB or the personal video recorder PVR, a fast forward or a rewinding can be allowed. This can also be available for the advertising items. However, during the advertising items, the fast forward and rewind features may be disabled. Furthermore, it can be determined whether an advertisement item can be copied or not, whether it has an expiration data and whether it is to be deleted on the expiration date or not.

Figure 5:
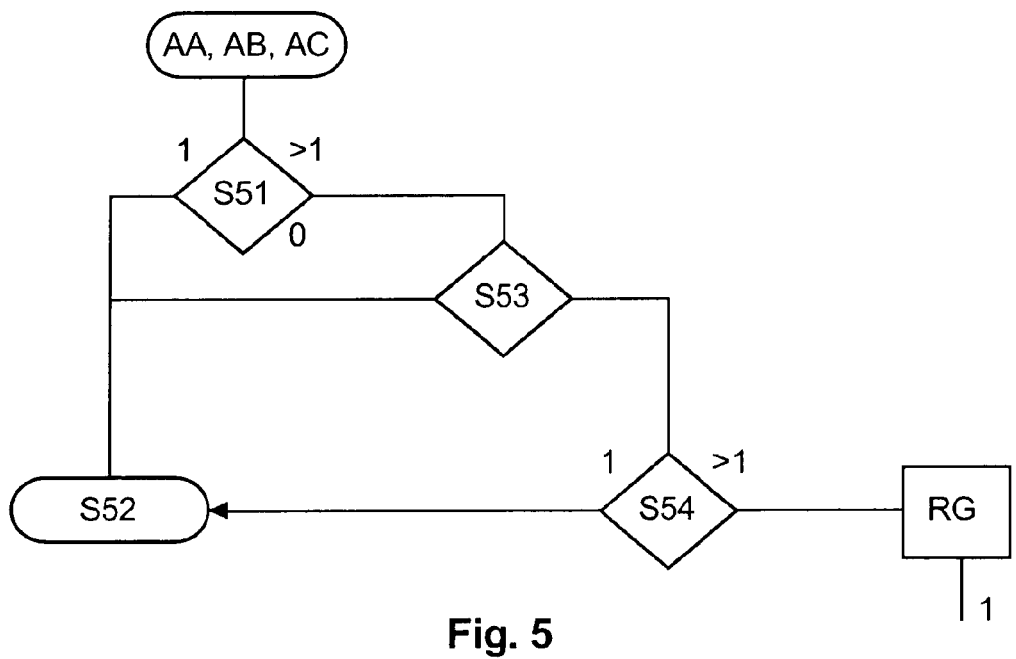
FIG. 5 shows a flow chart of an advertisement decision method according to a fourth embodiment.

FIG. 5 shows a flow chart of an advertisement decision method according to a fourth embodiment. In FIG. 5, a flow chart of a conflict resolution is provided if several advertising items are present and can be placed into the playlist or the personal channel. An advertising item can be associated to one or more items in a playlist or a personal channel. The association of an advertising item to a content in the playlist can be performed on several criteria. For example, in step S50, several advertising items AA, AB, AC may be present. In step S51, the advertising items AA, AB, AC are sorted based on the decision criteria. The decision criteria may be based on metadata on the advertising item as well as on information with respect to the content and the target group. In step S51, the available advertising items are sorted based on a first decision criteria. If only one advertising item AA, AB, AC matches the first decision criteria, the flow will continue to step S52 and the association between the item in the playlist and the advertising item is found. However, if more than one advertising item is present which fulfils the first decision criteria, the flow will continue to step S53, where a further sorting is performed based on a second decision criteria. If in step S53 only one advertising item is determined which fulfils the second decision criteria, the flow will continue to step S52. However, if in step S53 it is determined that more than one advertising item fulfils the second decision criteria, the flow will continue to step S54. Here, a comparison is performed with respect to stored information on the content and/or the target group. If more than one advertising item is present which fulfils the comparison in step S34, one of these advertising items is selected based on the results of a random generator RG.

Figure 6:
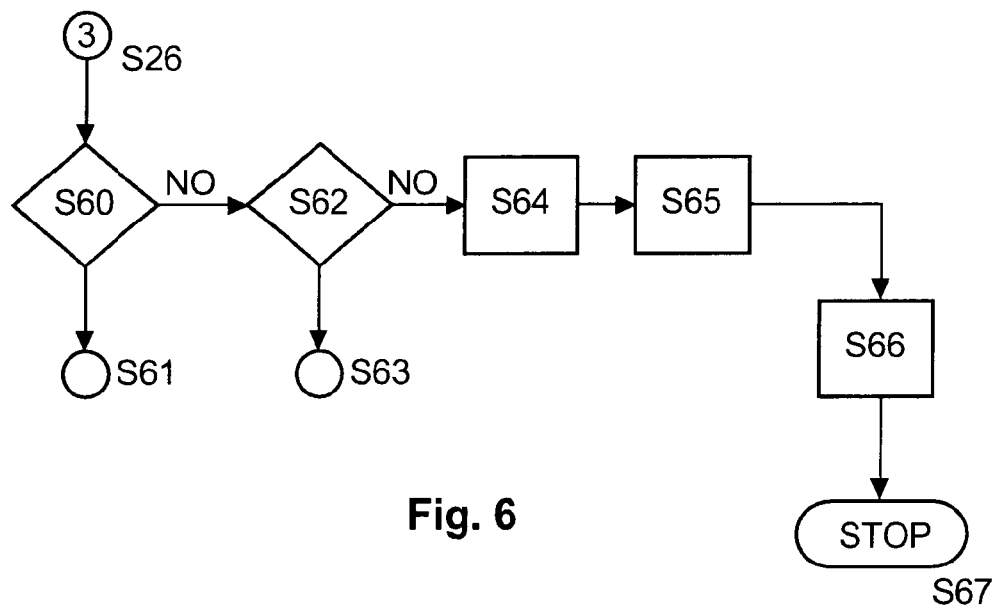
FIG. 6 shows a flow chart of an advertisement placement method according to a fifth embodiment.

FIG. 6 shows a flow chart of an advertisement placement method according to a fifth embodiment. Here, the placement of pre-roll or post-roll video advertising items is explained in more detail. The pre-roll or post-roll videos can be inserted into the playlist or the personal channel before or after an event. It should be noted that the insertion, the placement and the prioritisation of pre-roll and post-roll videos can be performed as described with respect to the infomercials. Preferably, only a fixed number of pre-roll and post-roll videos are allowed per event. Metadata of the pre-roll and post-roll videos may include the allowed positions like before, after or both.

In the steps S60 to S67, the process of step S28 is described in more detail. The flow starts at step S60 to determine whether an advertising item has previously been introduced into the playlist that has been deleted by a user. Therefore, in step S60 it is determined whether the advertising item has been previously placed with an event or a channel. If this is the case, the process is stopped in step S61, otherwise, the flow continues to step S62. Here, it is determined whether the advertising item has been placed more than X times in the system. If this is the case, the flow will continue to step S63 and is stopped. Otherwise, the flow continues to step S64 where the advertising item is associated to an object. In step S65, the advertising item is placed in relation to the event, either before (pre-roll) or after (post-roll). Then the flow continues to step S66 where the ad is deleted when the event is deleted or where the ad is archived if the event is archived. Then the flow continues to step S67 where the process is stopped.

The placement of pre-roll and post-roll advertising items can be coupled or decoupled from the playlist of the channel. Its triggering can be performed each time a change of the playback items is required. This can be due to the finishing of an item in the playlist or that a next item is started or that the channel has been changed.

In the following, interactive elements are described in more detail. One of such interactive elements is an overlay, i.e. a window on the display, on which an advertising item can be replayed. In other words, an overlay can be placed on top of a video or a content of a playlist.

Figure 7:
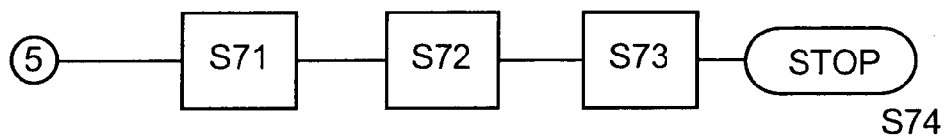
FIG. 7 shows a flow chart of an overlay placement method according to a sixth embodiment.

FIG. 7 shows a flow chart of an overlay placement method according to a sixth embodiment. The flow starts in step S70 and in step S71, a target location for the overlay is determined. This can be performed based on a list of target locations which may relate to event IDs or advertising item IDs where the overlay can be placed. The placement information may include the location in the video as well as the display duration. Alternatively, the placement information may also be included in the video signal. In step S72, the overlay is associated with each location and the position and duration of the rendering of the overlay is determined. In step S73, the overlay will stay in its location until it is replaced or removed. In step S74, the process is stopped.

The metadata of an overlay may comprise graphic information like undefined or customized, a remote control button for action, target action, a time stamp in a video and target videos.

Figure 8:
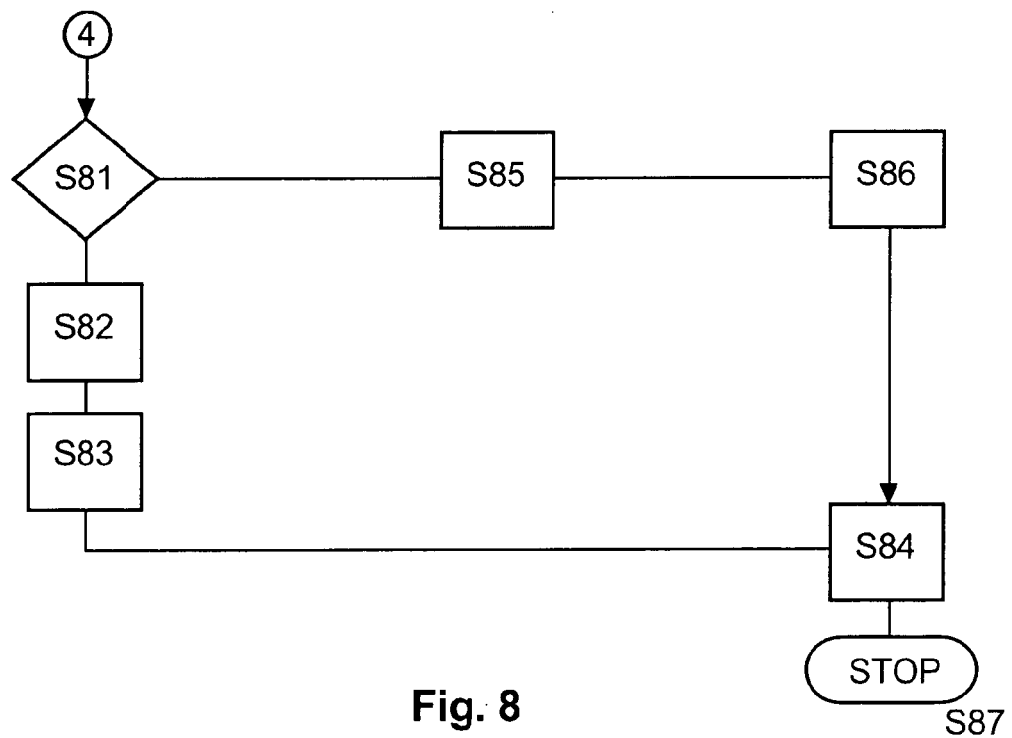
FIG. 8 shows a flow chart of a banner placement method according to a seventh embodiment.

FIG. 8 shows a flow chart of a banner placement method according to a seventh embodiment. Banners related to advertising images displayed in a predefined location, for example in the electronic program guide EPG. Such pages can be programmed for TV shows, detail pages, listings of time, channel and genre and searches. The targeting of a banner can be explicit without the involvement of the recommender. A placement of a banner from the content server CS may generate a first target list specifying a title which is being used for the placement on a program detail page including an event ID and a second target list specifying target criteria for placement of other EPG pages.

The process starts in step S80 and in step S81, it is determined which target list is to be used. If the detail pages are to be used, the flow will continue to step S82 where a show is determined which matches the ID of the event. For detail pages, banners can be targeted by the event ID, i.e. the target list is a list of event IDs.

Then the flow continues to step S83 where an ad is associated with detail pages of the found shows. Then the flow continues to step S84 where the banners are valid until they are replaced or removed.

If in step S81 it is determined that the target list relates to other EPG pages, the flow will continue to step S85 where a show is determined which matched the specified criteria. Then the flow continues to step S86 where an advertising item is associated to a specified EPG page of the matching shows. Thereafter, the flow continues to step S84.

It should be noted that the targeting of a banner can be performed without a recommender on the client's side. Banners may be associated to the detail pages of specific items in the playlist. A list of each banner can be generated for example on the content server. The banner may be related to the program details of an item in the playlist. Based on the banner criteria, matching shows can be found on the content server and a corresponding list can be generated. The list can be updated regularly. If several advertising items are targeted by one event, the first match may be selected and displayed.

The banner targeting may be based on search filters and search results as well as on EPG views. These may include the genre, the channel or normal EPG listings. The banner targeting may furthermore be based on suggested channel lists, editorial channels or a branded channel.

The metadata of the banner may include graphic information, EPG pages and criteria, remote control buttons for action like focus and select and specific button, list of associated events, list of associated genre, and target videos. Furthermore, the banner targeting may be based on a user profile like the previous user behaviour and preferences, a suggested channel list and event details.

Figure 9:
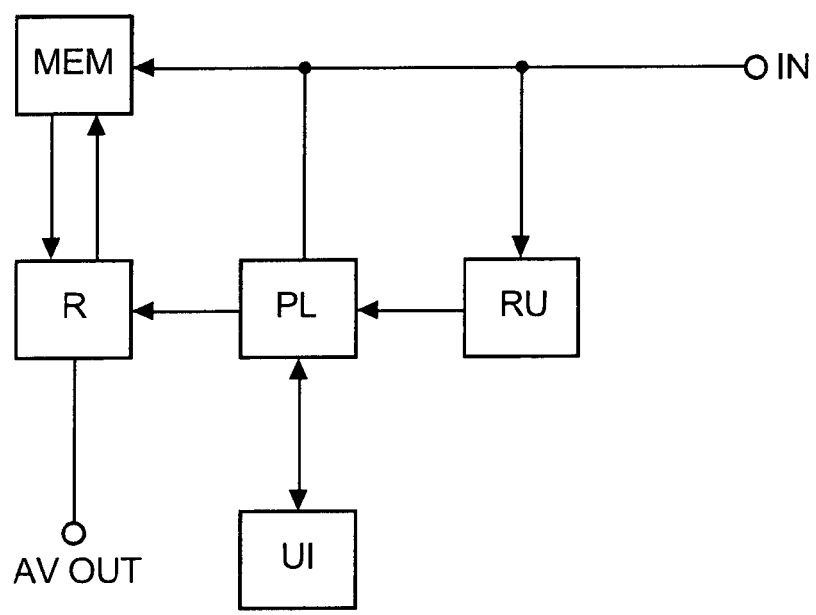
FIG. 9 shows a schematic block diagram of a set-top-box or a personal video recorder according to an eighth embodiment.

FIG. 9 shows a schematic block diagram of a set-top-box or a personal video recorder according to an eighth embodiment. The client device, i.e. the set-top-box STB, or the personal video recorder PVR comprises a memory MEM for storing or caching multi-media content received via the input terminal IN. The client device furthermore comprises a rendering unit R for rendering multi-media content stored in the memory MEM via an audio video output terminal AVOUT. The client device furthermore comprises a playlist unit PL for determining a playlist, a recommender unit RU for recommending advertising items which can be introduced into the playlist and a user interface UI which can be coupled to the playlist unit PL. The playlist unit PL serves to create a playlist, i.e. a selection of first multi-media content items from the plurality of channels received via the input terminal IN. The user can select the desired items via the user interface UI. The rendering unit R will then render those content items stored in the memory MEM according to the contents included in the playlist.

The memory MEM may serve as a memory for storing selected content items from a plurality of channels. The memory MEM may also serve for caching at least part of the content items from a plurality of channels. In particular, the content items which are part of the playlist can be stored or cached in the memory MEM. The recommender unit RU serves to recommend advertising items (second multi-media content items) which are to be introduced into the playlist PL based on a user profile, metadata of the content in the playlist as well as metadata of the available advertising items and a selected distribution scheme for the advertising items. The recommender unit RU is furthermore used to find an advertising item that can fit into an available space in the playlist.

In addition or alternatively, a report of which advertising item is selected can be forwarded to the content server CS as feedback.

According to a ninth embodiment, which can be based on any of the first to eighth embodiment, the selection of the advertising content, i.e. the second multimedia content item, is performed by calculating three scoring parameter. The first scoring parameter relates to a relevance value, which can be based on the price of the advertising item and the average acceptance factor. The second scoring parameter relates to the accuracy of the hits of the filter criteria. The third scoring parameter relates to a scoring value with respect to content of the first and second content items. The three score values of the second content items are evaluated and the second content item, which has the highest scores, will be selected to be introduced into the playlist.

The average acceptance factor can be determined by the relationship between the advertising items which are watched and the advertising items which are to be placed. This relationship can be determined based on a feedback of previous campaigns. As an example, its value can be set to 50% as initial value.

It should be noted that all first to ninth embodiments can be combined with any of the other embodiments.

What is claimed is:

1. A method of distributing second multi-media content items into a list having at least one first multi-media content item, wherein the list of first multi-media content items is to be reproduced on a personal TV system, comprising the steps of
    selecting a playlist of first multi-media content items from a plurality of first multi-media content items available on different TV channels,
    determining potential second multi-media content items from a plurality of available second multi-media content items by matching information from the first and second multi-media content items,
    selecting at least one of the determined second multi-media content items based on a user profile, metadata of the first and second multi-media content items and/or a distribution scheme for distributing the second multi-media content item into the playlist of first multi-media content items, wherein the selection of one of the determined second multi-media content items includes
    determining how many potential second multi-media content items have been determined by matching information from the first and second multi-media content items, and when more than one potential second multi-media content item has been determined, sorting the potential second multi-media content items according to a first relevance coefficient and,
    when more than one second multi-media content item is present with a highest first relevance coefficient, sorting the potential second multi-media content items according to a second relevance coefficient, and
    determining potential second multi-media content items having a highest second relevance coefficient, and presenting the selected at least one of the determined second multi-media content items along with the first multi-media content items to the personal television system.

2. The method according to claim 1, wherein the first multi-media content items are multi-media content items available on the plurality of TV channels and wherein the second multi-media content items are advertisement items.

3. The method according to claim 1, wherein the determining of potential second multi-media content items and the selecting of at least one of the determined second multi-media content items is triggered by selecting a new first multi-media content item into the playlist or by deleting a first multi-media content item from the playlist.

4. The method according to claim 1, wherein
    the selection of one of the determined second multi-media content items is based on a previous placement of the second multi-media content item into the playlist, and wherein a sorting of the determined second multi-media content items when more than one second multi-media content item has been determined, is based on at least one relevance coefficient.

5. A set-top-box, comprising
    a memory for storing or caching first and second multi-media content items, a playlist unit for creating a playlist of a plurality of first multi-media content items from available first multi-media content on different TV channels,
    a recommender unit for determining potential second multi-media content items from a plurality of available second multi-media content items by matching information on the first and second multi-media content items and by selecting at least one of the determined second multi-media content items based on a user profile, metadata of the first and second multi-media content items and/or a distribution scheme for distributing the second multi-media content item into the playlist of first multi-media content items, wherein the selection of one of the determined second multi-media content items includes
    determining how many potential second multi-media content items have been determined by matching information from the first and second multi-media content items, and when more than one potential second multi-media content item has been determined, sorting the potential second multi-media content items according to a first relevance coefficient and,
    when more than one second multi-media content item is present with a highest first relevance coefficient, sorting the potential second multi-media content items according to a second relevance coefficient, and a rendering unit for rendering first and second multi-media content items stored in the memory according to the playlist and presenting the selected at least one of the determined second multi-media content items along with the first multi-media content items to a personal television system.

6. A method of distributing second multi-media content items into a list having at least one first multi-media content item, wherein the list of first multi-media content items is to be reproduced on a personal TV system, comprising
    the steps of selecting a playlist of first multi-media content items from a plurality of first multi-media content items available on different TV channels,
    determining potential second multi-media content items from a plurality of available second multi-media content items by matching information from the first and second multi-media content items,
    selecting at least one of the determined second multi-media content items based on a user profile, metadata of the first and second multi-media content items and/or a distribution scheme for distributing the second multi-media content item into the playlist of first multi-media content items, wherein the selection of one of the determined second multi-media content items includes determining how many potential second multi-media content items have been determined by matching information from the first and second multi-media content items,
    and when more than one potential second multi-media content item has been determined, sorting the potential second multi-media content items according to a first relevance coefficient and,
    when more than one second multi-media content item is present with a highest first relevance coefficient, sorting the potential second multi-media content items according to a second relevance coefficient, and determining potential second multi-media content items having a highest second relevance coefficient,
    and wherein said determining and selecting second multi-media content items from a plurality of available second multi-media content items includes determining a first, second and/or third score value for a plurality of second content items, wherein the first score value is associated to matching information of the first and second multi-media content items, the second score value is associated to determined acceptance factors and/or the third score value is associated to determined accuracies of hits based on filter criteria, wherein the first, second, and third score values are added together for each second content item and the second content item with the highest score value is selected, and presenting the selected at least one of the determined second multi-media content items along with the first multi-media content items to the personal television system.

* * * * *